(12) United States Patent
Anvari

(10) Patent No.: US 7,787,564 B1
(45) Date of Patent: Aug. 31, 2010

(54) COMBINED PEAK REDUCTION EQUALIZER AND PHASE/AMPLITUDE PRE-DISTORTION

(75) Inventor: Kiomars Anvari, 1567 Serafix Rd., Alamo, CA (US) 94507

(73) Assignee: Kiomars Anvari, Alamo, CA (US)

( * ) Notice: Subject to any disclaimer, the term of this patent is extended or adjusted under 35 U.S.C. 154(b) by 840 days.

(21) Appl. No.: 11/717,214

(22) Filed: Mar. 13, 2007

(51) Int. Cl.
 $H04K\ 1/02$ (2006.01)
(52) U.S. Cl. .................. 375/297; 375/260; 375/295; 375/296; 375/306; 375/327; 330/136; 330/149
(58) Field of Classification Search .................. 375/242, 375/254, 271, 286, 295, 296, 297, 302, 135, 375/150, 243, 259, 260, 299, 306, 343, 350, 375/359; 330/149, 136
See application file for complete search history.

(56) References Cited

U.S. PATENT DOCUMENTS

| | | | | |
|---|---|---|---|---|
| 6,985,033 B1 * | 1/2006 | Shirali et al. | ................ | 330/149 |
| 7,071,777 B2 * | 7/2006 | McBeath et al. | ............ | 330/149 |
| 7,336,716 B2 * | 2/2008 | Maltsev et al. | .............. | 375/260 |
| 7,460,613 B2 * | 12/2008 | Sahlman | ..................... | 375/296 |
| 2005/0017800 A1 * | 1/2005 | Robinson | .................... | 330/149 |
| 2005/0017801 A1 * | 1/2005 | Bachman et al. | ............ | 330/149 |
| 2006/0012427 A1 * | 1/2006 | Nezami | ..................... | 330/149 |
| 2009/0206928 A1 * | 8/2009 | Bowles et al. | ........... | 330/124 R |

* cited by examiner

*Primary Examiner*—Shuwang Liu
*Assistant Examiner*—Hirdepal Singh

(57) ABSTRACT

A technique for a combined peak reduction equalizer filter and phase/amplitude pre-distortion is described. The input to a transmitter chain is modified by a combined equalizer filter and pre-distorter, prior to being applied to the transmitter chain. The equalizer filter modifies and smoothen the amplitude of the signal followed by pre-distorter to compensate for phase and amplitude distortion from transmitter chain or power amplifier. The modified and smoothen signal has its peaks reduced before being pre-distorted. The baseband signal pre-distortion results in cancellation of the distortion being introduced by the power amplifier or the transmitter chain. The amplitude pre-distortion is applied to the amplitude of the peak reduced baseband signal using the envelope information from the output of the transmitter chain or power amplifier and the phase pre-distortion is applied to the phase of the peak reduced baseband signal using the differential phase information between input and output of the power amplifier or the transmitter chain.

10 Claims, 8 Drawing Sheets

US 7,787,564 B1

COMBINED PEAK REDUCTION EQUALIZER AND PHASE/AMPLITUDE PRE-DISTORTION

BACKGROUND OF INVENTION

The present invention relates to a combined peak reduction equalizer filter and phase/amplitude pre-distortion to boost the performance of any Orthogonal Frequency Division Multiplexing (OFDM) and Orthogonal Frequency Division Multiple Access (OFDMA) communication transmitter. In any OFDM and OFDMA communication system one of the critical sub-systems is the transmitter. This sub-system has a major contribution in cost, power consumption, and size of the system. The main reason is the requirement of communication transmitter sub-system for linear components. The higher the linearity, the higher the power consumption, cost and size. In order to minimize the cost, size and power consumption there is a need for techniques that overcome this problem. This invention conquers these challenges by using a simple and accurate combined peak reduction equalizer filter and phase/amplitude pre-distortion module used at the input to this sub-system.

SUMMARY OF INVENTION

According to the invention, a combined peak reduction equalizer filter and phase/amplitude pre-distortion, for use with OFDM and OFDMA communication transmitter sub-system, uses a plurality of simple and accurate algorithm in conjunction with intelligent signal processing to improve signal handling of any wireless, optical, or wireline communication transmitter. By intelligent, it is meant that the algorithm has features of maintaining the signal emission and quality requirements while applying the combined peak reduction equalizer filter and phase/amplitude pre-distortion. The combined peak reduction equalizer filter and phase/amplitude pre-distortion uses the transmitter sub-system input which is a baseband signal as its input and conditions, smoothens and pre-distorts the signal before applying it back to the transmitter sub-system. The conditioning, smoothening and pre-distortion helps to boost the power handling of the transmitter sub-system or acts more linearly.

In a particular embodiment, the combined peak reduction equalizer filter and phase/amplitude pre-distortion algorithm comprises a signal processing module. The signal processor performs the signal conditioning, smoothening and pre-distortion.

The invention will be better understood by reference to the following detailed description in conjunction with the accompanying drawings.

DESCRIPTION OF THE SPECIFIC EMBODIMENTS

In a first preferred embodiment of the invention, a peak reduction equalizer filter uses digital baseband signal. In a second preferred embodiment the main baseband signal is amplitude conditioned and smoothened using a peak reduction equalizer filter with a dynamically configurable weighting mask. In a third embodiment a peak reduction equalizer filter injects in band and out of band signal into the main baseband signal through a feedforward loop. In a fourth embodiment the injected in band and out of band signal into the main baseband signal is adjusted by a dynamically configurable weighting mask in a feedforward loop. In a fifth embodiment the equalizer filter in a feedforward loop uses Discrete Fourier Transform and Inverse Discrete Fourier Transform DFT/IDFT. In a sixth embodiment a dynamically configurable MASK gets its input from a MASK updating algorithm. In a seventh embodiment a MASK updating algorithm gets its input from an OFDM or OFDMA physical layer PHY, Median Access Control layer MAC, an external interface, and peak-to-average calculation of the output of the peak reduction equalizer filter. In an eight embodiment a MASK updating algorithm gets its input from output of an OFDMA detector, an external interface, and peak-to-average calculation of the output of the peak reduction equalizer filter. In a ninth embodiment a peak-to-average calculation algorithm is used to calculate the peak-to-average of the output of the peak reduction equalizer filter. In a tenth embodiment the out put of a peak reduction equalizer filter is amplitude and phase pre-distorted to produce a peak reduced and pre-distorted main baseband signal. In an eleventh embodiment lookup tables or polynomials are used for pre-distorting the peak reduced main baseband signal. In a twelfth embodiment phase and amplitude updating algorithms are used to update the phase and amplitude pre-distortion lookup tables and polynomials. In a thirteenth embodiment the phase and amplitude pre-distortion are applied independently. In a fourteenth embodiment a phase detector using input and output of an amplifier is used to detect the phase distortion due to an amplifier. In a fifteenth embodiment an envelop detector using the output of an amplifier is used to detect the envelop of the amplifier output. In a sixteenth embodiment an Analog-to-Digital (A/D) converter is shared to convert the amplifier's phase conversion and envelop to digital signal.

Figure 1:
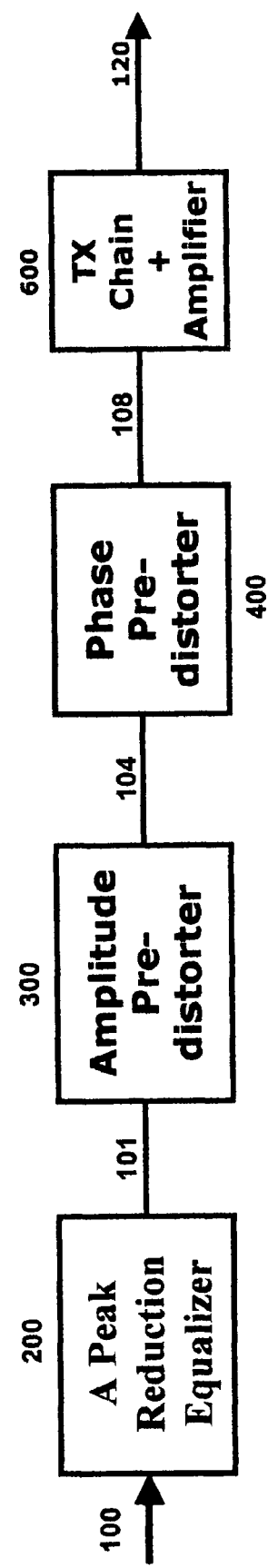
FIG. 1 is an overall block diagram of the combined peak reduction equalizer filter and phase/amplitude pre-distortion

Referring to FIG. 1, block diagram of a combined peak reduction equalizer filter and phase/amplitude pre-distortion for OFDM or OFDMA signal is illustrated. The peak reduction equalizer filter 200 receives its baseband input 100 and produce conditioned and smoothened output baseband signal 101. The peak reduced main baseband signal 101 is applied to amplitude pre-distorter function 300 to produce peak reduced and amplitude pre-distorted main baseband signal 104. The main peak reduced and amplitude pre-distorted baseband signal 104 is applied to phase pre-distortion function 400 to produce peak reduced, amplitude pre-distorted, and phase pre-distorted main baseband signal 108. Finally the modified baseband signal 108 is applied to the transmitter chain function 600 to produce the transmit signal 120.

Figure 2:
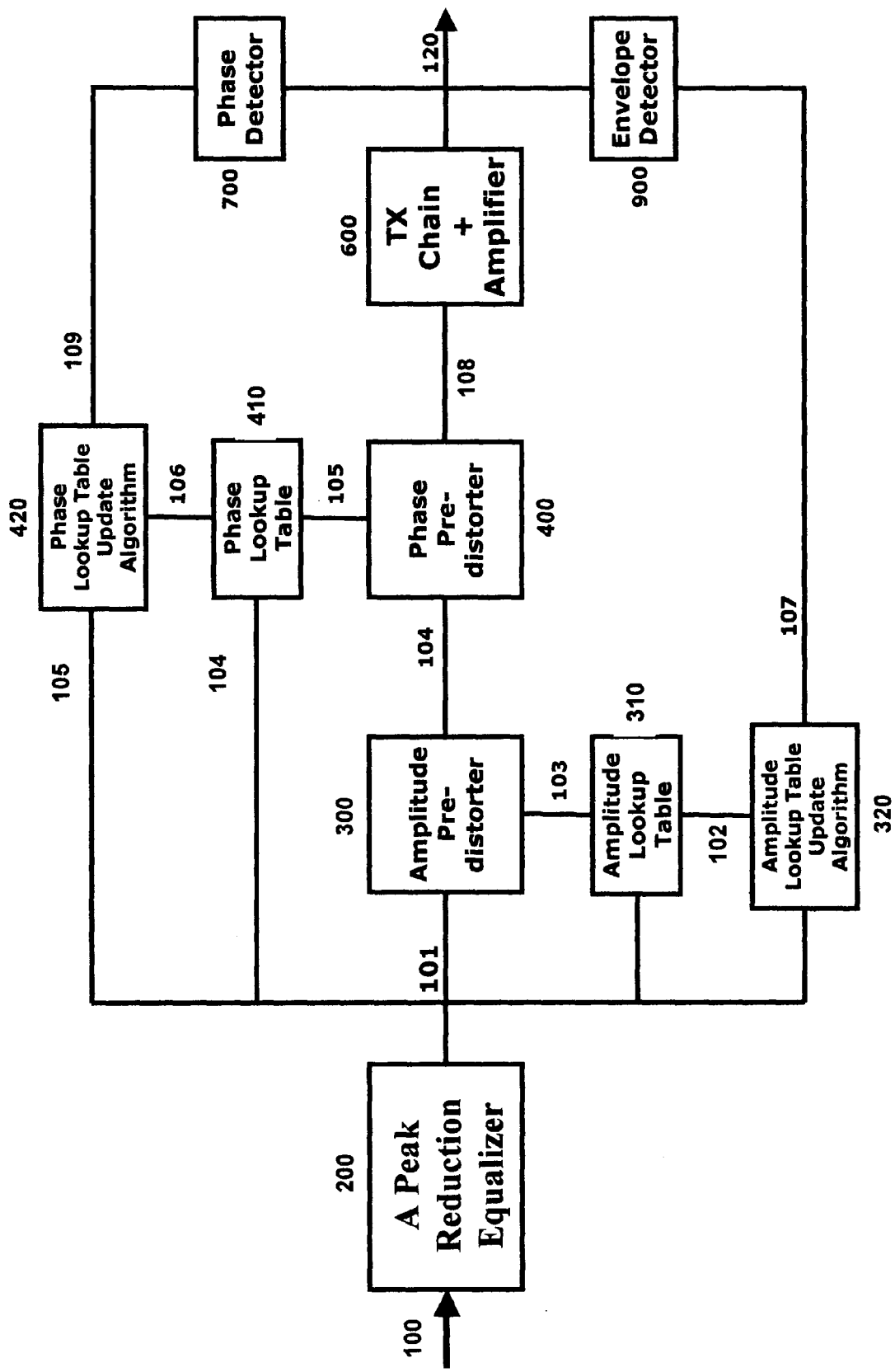
FIG. 2 is the detail block diagram of the combined peak reduction equalizer filter and phase/amplitude pre-distortion using lookup table

FIG. 2 illustrates the detail block diagram of the combined peak reduction equalizer filter and phase/amplitude pre-distortion using lookup table for OFDM and OFDMA baseband signals. The received main baseband signal 100 is applied to peak reduction equalizer filter 200 to produce peak reduced main baseband signal 101. The peak reduced baseband signal 101 is applied to amplitude pre-distortion function 300 to have its amplitude pre-distorted based on the amount of pre-distortion supplied by amplitude lookup table 310. The amplitude lookup table 310 uses the magnitude of the peak reduced baseband signal 101 to determine the amount of the amplitude pre-distortion 103. The amplitude lookup table 310 is being dynamically updated by amplitude lookup table update algorithm 320. The amplitude lookup table update algorithm 320 uses the magnitude of the peak reduced baseband signal 101 and the envelop of the power amplifier or transmitter output signal 107 from the output of the envelope detection function 900 to provide the amplitude update 102 for amplitude lookup table 310.

The peak reduced and amplitude pre-distorted baseband signal 104 is applied to phase pre-distortion function 400 to have its phase pre-distorted based on the amount of pre-distortion supplied by phase lookup table 410. The phase lookup table uses the magnitude of the peak reduced baseband signal 101 to determine the amount of the phase pre-distortion 105. The phase lookup table 410 is being dynamically updated by phase lookup table update algorithm 420. The phase lookup table update algorithm 420 uses the magnitude of the peak reduced baseband signal 101 and phase difference between the input and output of the power amplifier or the transmitter 109 from the phase detection function 700 to provide the phase update 106 for phase lookup table 410.

The peak reduced, amplitude pre-distorted, and phase pre-distorted signal 108 is applied to transmitter plus power amplifier function 600 to produce the transmitter output signal 120.

Figure 3:
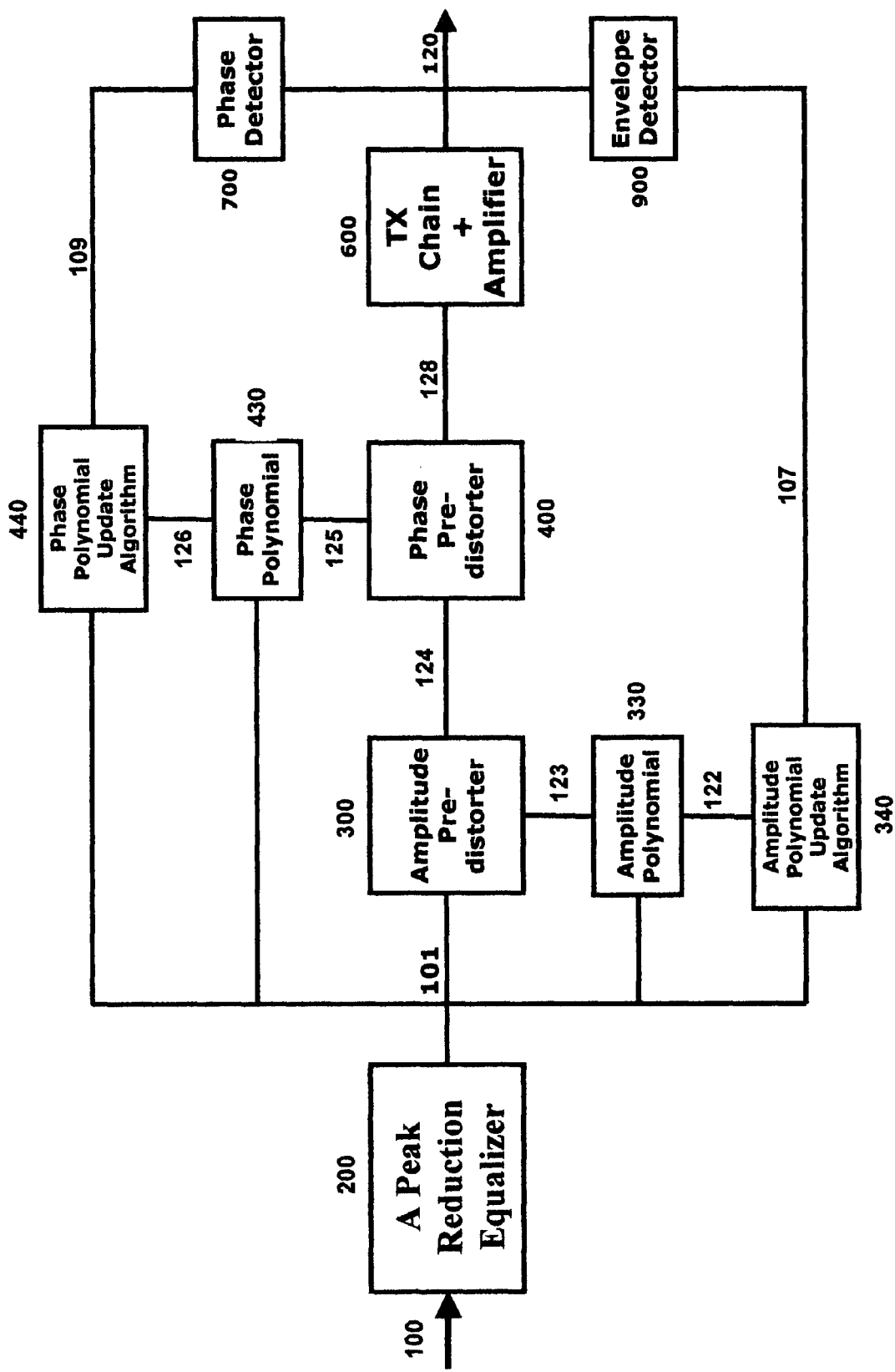
FIG. 3 is the detail block diagram of the combined peak reduction equalizer filter and phase/amplitude pre-distortion using polynomial

FIG. 3 illustrates the detail block diagram of the combined peak reduction equalizer filter and phase/amplitude pre-distortion using polynomial for OFDM and OFDMA baseband signals. The received main baseband signal 100 is applied to peak reduction equalizer filter 200 to produce peak reduced main baseband signal 101. The peak reduced baseband signal 101 is applied to amplitude pre-distortion function 300 to have its amplitude pre-distorted based on the amount of pre-distortion supplied by amplitude polynomial 330. The amplitude polynomial uses the magnitude of the peak reduced baseband signal 101 to determine the amount of the amplitude pre-distortion 123. The amplitude polynomial 330 is being dynamically updated by amplitude polynomial update algorithm 340. The amplitude polynomial update algorithm 340 uses the magnitude of the peak reduced baseband signal 101 and envelop of power amplifier or transmitter output signal 107 from the output of the envelope detection function 900 to provide the amplitude update 122 for amplitude polynomial 330.

The peak reduced and amplitude pre-distorted baseband signal 124 is applied to phase pre-distortion function 400 to have its phase pre-distorted based on the amount of pre-distortion supplied by phase polynomial 430. The phase polynomial uses the magnitude of the peak reduced baseband signal 101 to determine the amount of the phase pre-distortion 125. The phase polynomial 430 is being updated by phase polynomial update algorithm 440. The phase polynomial update algorithm 440 uses the magnitude of the peak reduced baseband signal 101 and phase difference between the input and output of the power amplifier or the transmitter 109 from the phase detection function 700 to provide the phase update 126 for phase lookup table 430.

The peak reduced, amplitude pre-distorted, and phase pre-distorted signal 128 is applied to transmitter plus power amplifier function 600 to produce the transmitter output signal 120.

Figure 4:
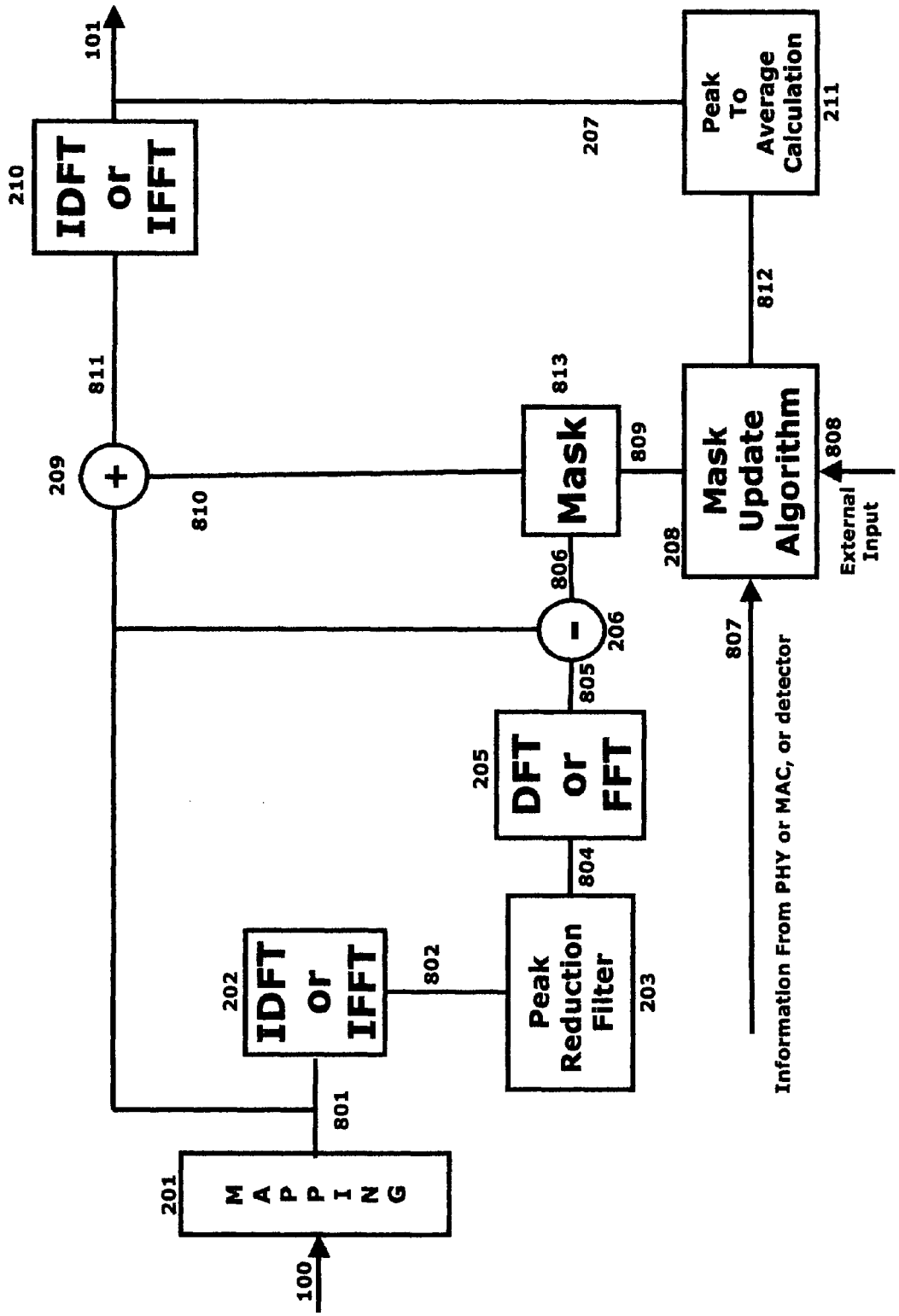
FIG. 4 is the detail block diagram of the peak reduction equalizer filter

FIG. 4 illustrates the detail block diagram of the peak reduction equalizer filter. The data stream 100 is applied to a modulator/mapping function 201 to produce the sub-carriers signals 801. The sub-carrier signals 801 is applied to the Inverse Discrete Fourier Transform IDFT or Inverse Fast Fourier Transform IFFT function 202 to produce the time domain baseband signal 802. The time domain baseband signal 802 is applied to peak reduction filter 203 to produce peak reduced main baseband signal 804. The peak reduced time domain main baseband signal 804 is converted to frequency domain using Discrete Fourier Transform DFT or Fast Fourier Transform FFT function 205 to produce frequency domain signal 805. The frequency domain signal 805 is subtracted from sub-carrier signal 801 to produce frequency domain signal 806, the subtraction of the frequency domain peak reduced time domain OFDMA signal 805 and sub-carrier signal 801. The frequency domain signal 806, the subtraction of the frequency domain peak reduced time domain OFDMA signal 805 and sub-carrier signal 801 is applied to MASK function 813 to be modified and weighted by weighting information 809 supplied by Mask Update Algorithm function 208. The frequency domain signal 810 the output of the MASK function 813 is added to sub-carrier signal 801 in adding function 209 to produce the new sub-carrier signal 811. The new sub-carrier signal 811 is applied to IDFT or IFFT function 210 to produce the time domain peak reduced baseband signal 101. The time domain peak reduced baseband signal 101 is used by peak-to-average calculation function 211 to produce the peak-to-average information 812 for the Mask Update Algorithm function 208. The Mask Update Algorithm 208 uses the information supplied by peak-to-average calculation function 211, external input information 808, information from PHY or MAC or a detector to update the MASK function 813 by update signal 809.

Figure 5:
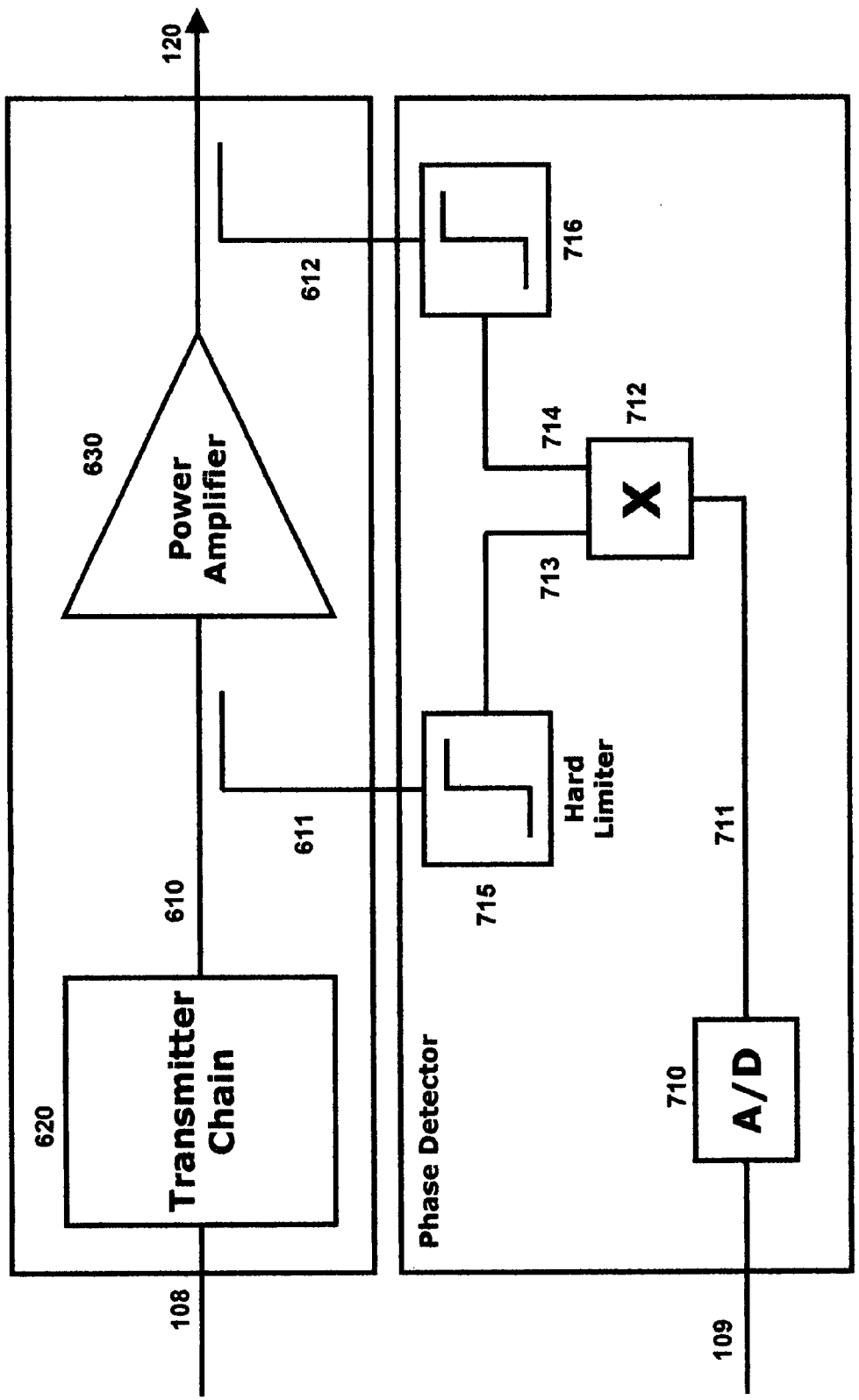
FIG. 5 is the detail block diagram of the phase detector

FIG. 5 illustrate the detail block diagram of the phase detector 700. The peak reduced, amplitude pre-distorted, and phase pre-distorted signal 108 or 128 is applied to transmitter chain 620 to produce signal 610, the input to the amplifier 620. The amplifier 620 amplifies the output of the transmitter chain to produce the amplified transmission signal 120. The input of the amplifier 620 is sampled to produce amplifier input signal 611. The output of the amplifier is sampled to produce amplifier output signal 612. The amplifier input 611 is amplitude limited to remove the amplitude and obtain the phase 713 of the amplifier input signal by hard limiter 715. The amplifier output 612 is amplitude limited to remove the amplitude and obtain the phase 714 of the amplifier output signal by hard limiter 716. The phase signals 714 and 713 are multiplied by multiplier 712 to produce the phase information 711 which is the phase difference between input and output of the amplifier. The phase difference is digitized by analog-to-digital converter A/D 710 to produce the phase information 109 for the phase update algorithm.

Figure 6:
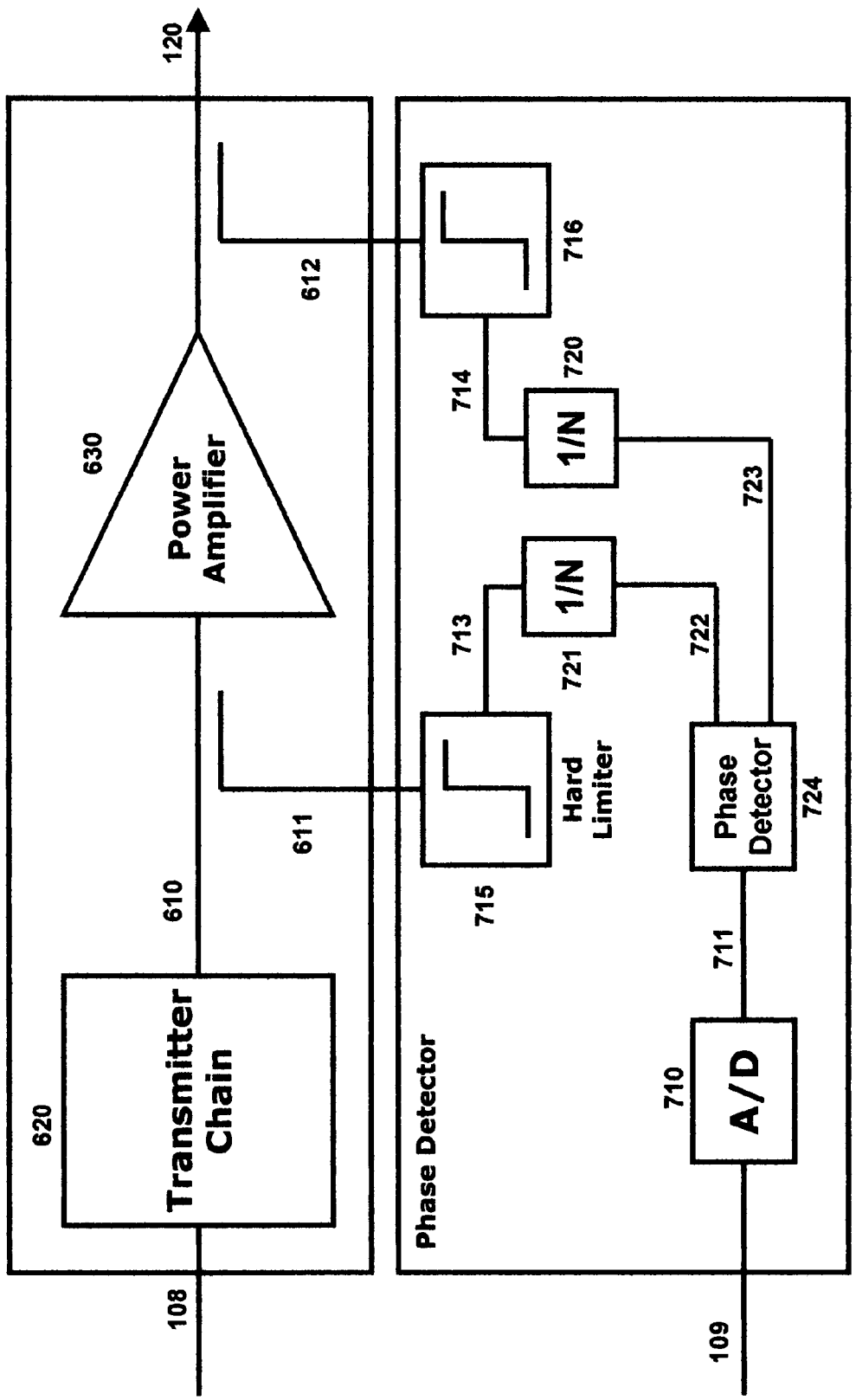
FIG. 6 is the detail block diagram of a phase detector using divider

FIG. 6 illustrate the detail block diagram of the phase detector 700. The peak reduced, amplitude pre-distorted, and phase pre-distorted signal 108 or 128 is applied to transmitter chain 620 to produce signal 610, the input to the amplifier 620. The amplifier 620 amplifies the output of the transmitter chain to produce the amplified transmission signal 120. The input of the amplifier 620 is sampled to produce amplifier input signal 611. The output of the amplifier is sampled to produce amplifier output signal 612. The amplifier input 611 is amplitude limited to remove the amplitude and obtain the phase 713 of the amplifier input signal by hard limiter 715. The amplifier output 612 is amplitude limited to remove the amplitude and obtain the phase 714 of the amplifier output signal by hard limiter 716. The phase signals 714 and 713 are frequency divided by dividers 720 and 721 to produce frequency divided signals 723 and 724. The frequency divided signals 722 and 723 are applied to phase detector 724 to produce the phase information 711 which is the phase difference between input and output of the amplifier. The phase difference is digitized by analog-to-digital converter A/D 710 to produce the phase information 109 for the phase update algorithm.

Figure 7:
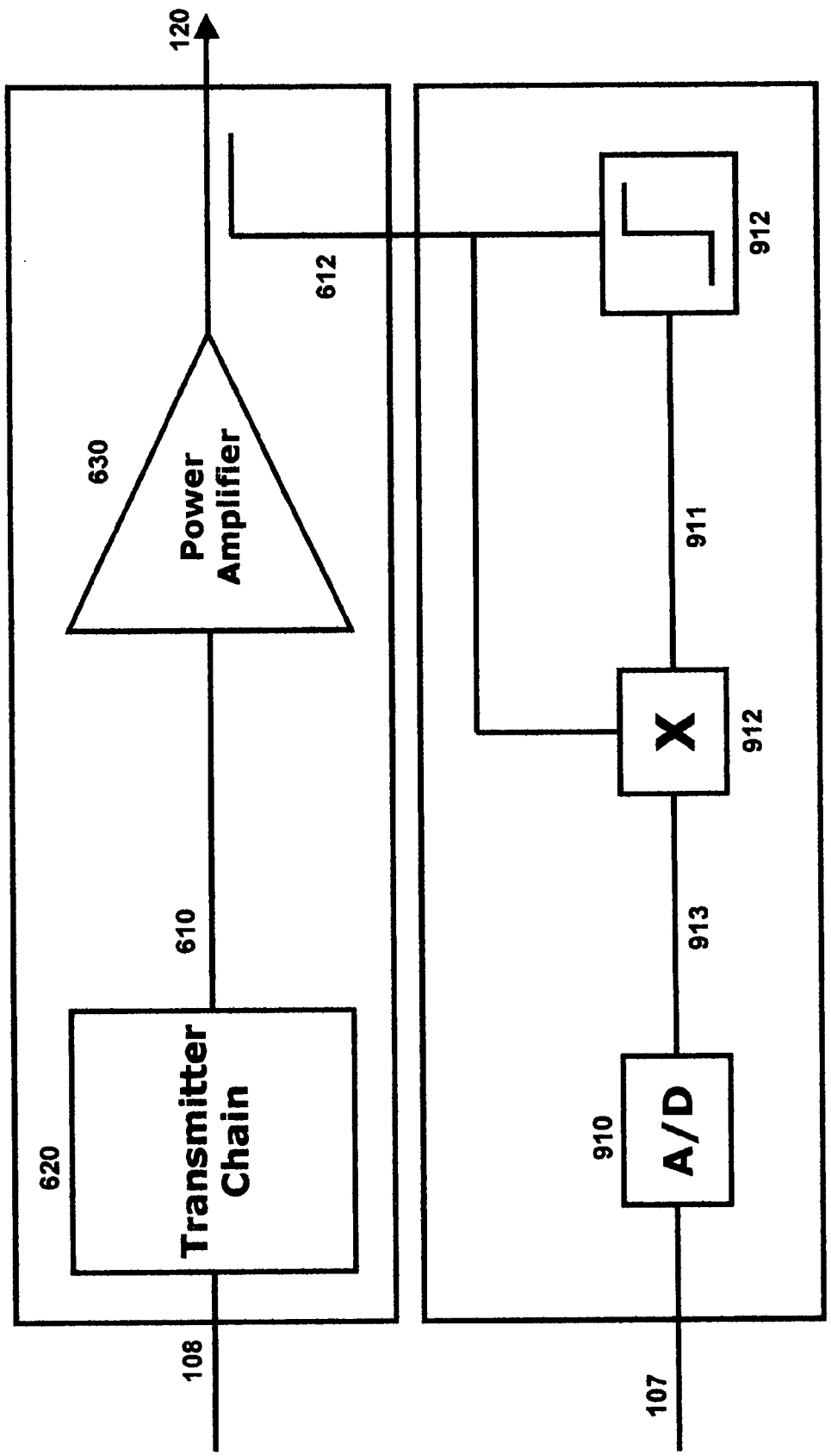
FIG. 7 is the detail block diagram of the envelope detector

FIG. 7 illustrate the detail block diagram of the envelope detector 900. The peak reduced, amplitude pre-distorted, and phase pre-distorted signal 108 or 128 is applied to transmitter chain 620 to produce signal 610, the input to the amplifier 620. The amplifier 620 amplifies the output of the transmitter chain to produce the amplified transmission signal 120. The output of the amplifier is sampled to produce amplifier output signal 612. The amplifier output 612 is amplitude limited to remove the amplitude and obtain the phase 911 of the amplifier output signal by hard limiter 912. The phase signals 911 and the amplifier output signal 612 are multiplied by multiplier 912 to produce the envelope information 913 which is the envelope of the output of the amplifier. The envelope signal 913 is digitized by analog-to-digital converter A/D 910 to produce the envelope information 107 for the amplitude update algorithm.

Figure 8:
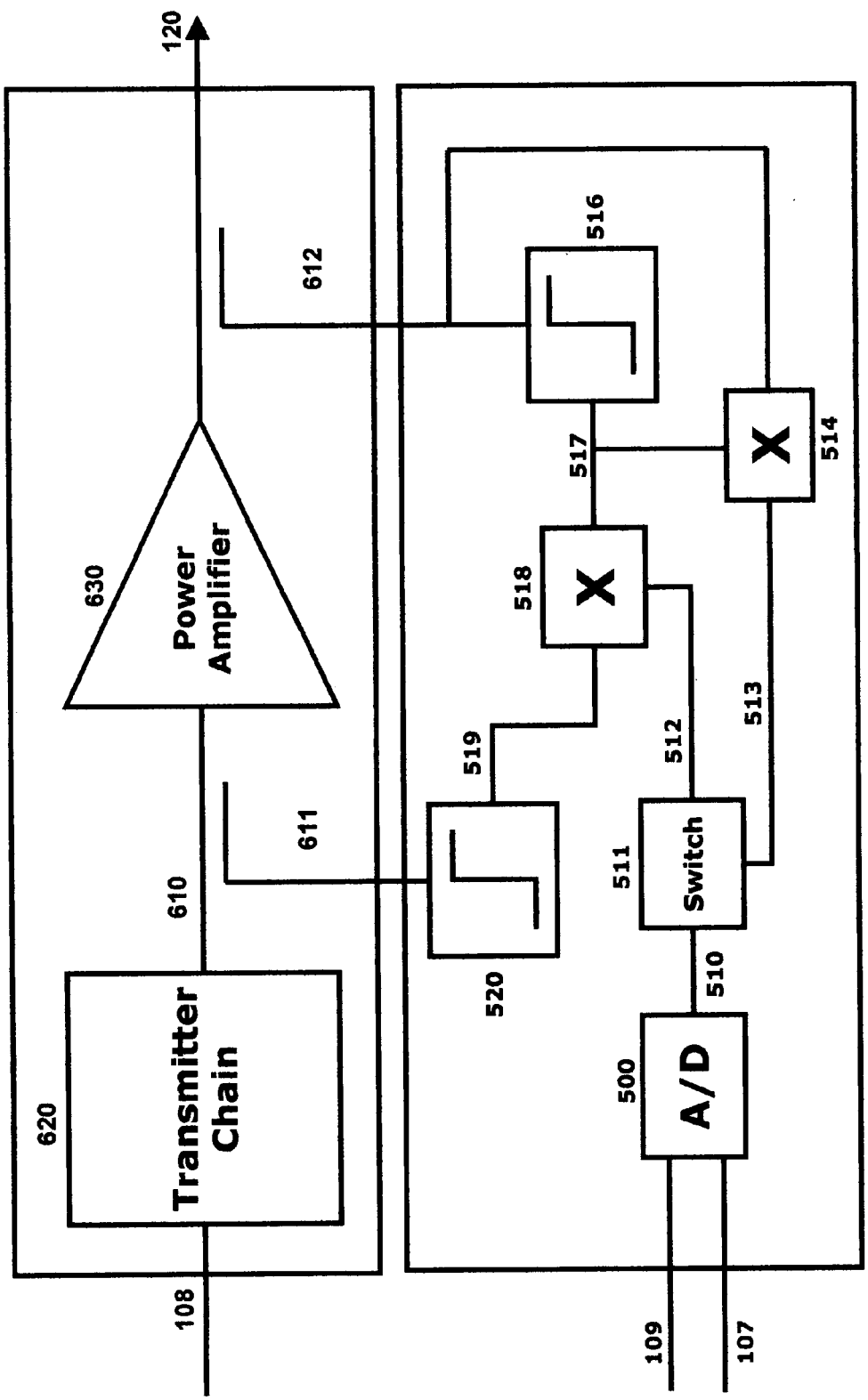
FIG. 8 is the detail block diagram of the combined phase and envelope detector

FIG. 8 illustrate the detail block diagram of the joint phase detector 700 and amplitude detector 900. The peak reduced, amplitude pre-distorted, and phase pre-distorted signal 108 or 128 is applied to transmitter chain 620 to produce signal 610, the input to the amplifier 620. The amplifier 620 amplifies the output of the transmitter chain to produce the amplified transmission signal 120. The input of the amplifier 620 is sampled to produce amplifier input signal 611. The output of the amplifier is sampled to produce amplifier output signal 612. The amplifier input 611 is amplitude limited to remove the amplitude and obtain the phase 519 of the amplifier input signal by hard limiter 520. The amplifier output 612 is amplitude limited to remove the amplitude and obtain the phase 517 of the amplifier output signal by hard limiter 516. The phase signals 519 and 517 are multiplied by multiplier 518 to produce the phase information 512 which is the phase difference between input and output of the amplifier. The phase difference 512 is applied to the switch function 511 to be selected and be digitized by analog-to-digital converter A/D 500 to produce the phase information 109.

The amplifier output 612 is amplitude limited to remove the amplitude and obtain the phase 517 of the amplifier output signal by hard limiter 516. The phase signals 517 and the amplifier output signal 612 are multiplied by multiplier 514 to produce the envelope information 513 which is the envelope of the output of the amplifier. The envelope signal 513 is applied to the switch function 511 to be selected to be digitized by analog-to-digital converter A/D 500 to produce the envelope information 107 for the amplitude update algorithm.

What is claimed is:

1. A combined peak reduction equalizer filter and phase/amplitude pre-distortion apparatus for use with Orthogonal Frequency Division Multiplexing (OFDM) and Orthogonal Frequency Division Multiple Access (OFDMA) signals to enhance the performance of any wireless and wireline communication transmitter, in any wireless cellular, Personal Communication System (PCS), wireless Local Area Network and Wireless Wide Area Network (LAN/WAN), WiMax, Video and Audio Wireless Broadcasting, line of sight microwave, military, optical, satellite communication systems and any other none wireless applications, the combined peak reduction equalizer filter and phase/amplitude pre-distortion comprising:

a digital signal processing circuit to perform the combined peak reduction equalizer filter and phase/amplitude pre-distortion to condition, smoothen, and pre-distort the input baseband signal to a transmitter to improve the performance of the transmitter;

a digital signal processing circuit that performs peak reduction equalizer filter to produce a peak reduced main baseband signal;

a digital signal processing circuit that performs phase pre-distortion to produce a phase pre-distorted main baseband signal;

a digital signal processing circuit that performs amplitude pre-distortion to produce an amplitude pre-distorted main baseband signal;

an analog signal processing circuit that performs phase detection to produce a differential phase between input and output of an amplifier or a transmitter chain;

an analog signal processing circuit that performs envelop detection to produce envelop of the signal at the output of an amplifier or a transmitter chain;

a digital signal processing circuit that performs phase updating algorithm utilizing the digitized output of a phase detector and the phase of the peak reduced main baseband signal to produce a phase update for a first lookup table used by baseband phase pre-distortion function;

a digital signal processing circuit that performs amplitude updating algorithm utilizing the digitized output of an envelope detector and the amplitude of the peak reduced main baseband signal to produce an amplitude update for a second lookup table used by baseband amplitude pre-distortion function;

a digital signal processing circuit that performs phase polynomial updating algorithm utilizing the digitized output of the phase detector and the phase of the peak reduced main baseband signal to produce a phase polynomial update for a phase used by baseband phase pre-distortion function;

a digital signal processing circuit that performs amplitude polynomial updating algorithm utilizing the digitized output of the envelope detector and the amplitude of the peak reduced main baseband signal to produce an amplitude polynomial update for an amplitude used by baseband amplitude pre-distortion function.

2. The combined peak reduction equalizer filter and phase/amplitude pre-distortion according to claim 1, wherein the baseband signal is peak reduced by a dynamically configurable peak reduction equalizer filter, the peak reduction equalizer filter comprising:

a mapping block that maps the modulated frequency domain main baseband signal to designated sub-carriers;

a feed forward loop that injects controlled frequency domain in band and out of band signal into the frequency domain main baseband signal;

an addition block that adds the frequency domain main baseband signal and feedforward signal;

an IDFT or IFFT block that converts the sum of frequency domain main baseband signal and the feedforward signal to time domain;

a peak-to-average calculation block that calculates the peak power to average power of the time domain sum of frequency domain main baseband signal and the feedforward signal;

a MASK update algorithm that uses the output of the peak-to-average calculation block, external input, information from a Medium Access Control MAC layer or Physical PHY layer or output of a detector to update the weighting values in a MASK block.

3. The combined peak reduction equalizer filter and phase/amplitude pre-distortion according to claim 1, wherein the peak reduction equalizer filter uses a feedforward loop to injects controlled frequency domain in band and out of band baseband signal into frequency domain main baseband signal, a feedforward loop comprising:

a IDFT block that converts the frequency domain baseband signal to time domain baseband signal;

a peak reduction filter that reduces the peak of the time domain baseband signal;

a DFT block that converts the peak reduced time domain main baseband signal into frequency domain baseband signal;

a subtracting block that subtracts the frequency domain main baseband signal and the frequency domain peak reduced main baseband signal;

a MASK block that weights various frequency components of the subtraction of the frequency domain peak reduced main baseband signal and the frequency domain main baseband signal;

a summing block that adds the frequency domain main baseband signal with the weighted subtraction of frequency domain main baseband signal and the frequency domain peak reduced main baseband signal.

4. The combined peak reduction equalizer filter and phase/amplitude pre-distortion according to claim 1, wherein the dynamically configurable digital baseband peak reduction equalizer filter uses a MASK update algorithm function to produce weighting parameters for a dynamically configured MASK function, the MASK update algorithm function performing the following functions:

creates weighting parameters for a MASK block using the information supplied by a main baseband MAC layer or PHY layer;

creates weighting parameters for a MASK block using the information supplied by a detector or demodulator using the OFDM or OFDMA modem baseband signal as its input;

uses the OFDM or OFDMA baseband signal timing information, main OFDM or OFDMA baseband signal active sub-carriers information, main OFDM or OFDMA baseband signal modulation type used by active sub-carriers information, main OFDM or OFDMA baseband signal active sub-carrier's magnitude information, main OFDM or OFDMA baseband signal active pilot sub-carriers information, main OFDM or OFDMA baseband signal active synchronization sub-carriers information, main OFDM or OFDMA baseband signal active control channel sub-carriers information, main OFDM or OFDMA baseband signal active peak reduction sub-carriers information, main OFDM or OFDMA baseband signal active training and preamble sub-carriers information, main OFDM or OFDMA baseband signal guard band sub-carriers information, the main OFDM or OFDMA baseband signal idle sub-carriers, provided by MAC or PHY and the peak-to-average information from the output of the peak reduction equalizer filter to create dynamically configurable weighting parameters for a MASK block;

uses the main OFDM or OFDMA baseband signal timings information, main OFDM or OFDMA baseband signal active sub-carriers information, main OFDM or OFDMA baseband signal modulation type used by active sub-carriers information, main OFDM or OFDMA baseband signal active sub-carrier's magnitude information, main OFDM or OFDMA baseband signal active pilot sub-carriers information, main OFDM or OFDMA baseband signal active synchronization sub-carriers information, main OFDM or OFDMA baseband signal active control channel sub-carriers information, main OFDM or OFDMA baseband signal active peak reduction sub-carriers information, main OFDM or OFDMA baseband signal active training and preamble sub-carriers information, main OFDM or OFDMA baseband signal guard band sub-carriers information, the main OFDM or OFDMA baseband signal idle sub-carriers, provided by a OFDM or OFDMA detector or demodulator that uses the main baseband OFDM or OFDMA signal as its input, and the peak-to-average information from the output of the peak reduction equalizer filter to create dynamically configurable weighting parameters for a MASK block;

create weighting parameters defined by the information supplied by the baseband PHY layer or MAC layer;

create weighting parameters defined by the information supplied by the OFDM or OFDMA baseband detector or demodulator output;

create weighting parameters defined by the information supplied by the peak-to-average calculator;

create weighting parameters defined by the information supplied externally;

create weighting parameters based on external information, peak-to-average of the output of the peak reduction equalizer filter, and the modulation of the active sub-carriers defined by the information supplied by the baseband PHY layer or MAC layer;

create weighting parameters based on external information, peak-to-average of the output of the peak reduction equalizer filter, and the modulation of the active sub-carriers defined by the information supplied by an OFDM or OFDMA baseband detector or demodulator output;

create weighting parameters based on external information, peak-to-average of the output of the peak reduction equalizer filter, and the magnitude of the active sub-carriers defined by the information supplied by an OFDM or OFDMA baseband PHY layer or MAC layer;

create weighting parameters based on external information, peak-to-average of the output of the peak reduction equalizer filter, and the magnitude of the active sub-carriers defined by the information supplied by an OFDM or OFDMA baseband detector or demodulator output;

create weighting parameters based on external information, peak-to-average of the output of the peak reduction equalizer filter, and the type of the active sub-carriers defined by the information supplied by an OFDM or OFDMA baseband PHY layer or MAC layer;

create weighting parameters based on external information, peak-to-average of the output of the peak reduction equalizer filter, and the type of the active sub-carriers defined by the information supplied by an OFDM or OFDMA baseband detector or demodulator output;

create weighting parameters based on external information, peak-to-average of the output of the peak reduction equalizer filter, and the combination of modulation, magnitude and type of the active sub-carriers defined by the information supplied by an OFDM or OFDMA baseband PHY layer or MAC layer modulator output;

create weighting parameters based on external information, peak-to-average of the output of the peak reduction equalizer filter, and the combination of modulation, magnitude and type of the active sub-carriers defined by the information supplied by an OFDM or OFDMA baseband detector or demodulator output.

5. The combined peak reduction equalizer filter and phase/amplitude pre-distortion according to claim 1, wherein the phase detector is used to detect the phase difference between the input and the output of a transmitter chain or a power amplifier, a phase detector comprising:
   a coupler that provides attenuated version of a power amplifier or transmitter chain input and output signals;
   an amplitude hard limiter that removes the amplitude of the attenuated input signal to a power amplifier or a transmitter chain and keeps the phase of the signal;
   an amplitude hard limiter that removes the amplitude of the attenuated output signal from a power amplifier or a transmitter chain and keeps the phase of the signal;
   a multiplier that multiplies the phase of the input and output of a power amplifier or a transmitter chain to produce the phase difference between input and the output of a power amplifier or a transmitter chain;
   an analog to digital converter that digitizes the phase difference between input and output of a power amplifier or transmitter chain.

6. The combined peak reduction equalizer filter and phase/amplitude pre-distortion according to claim 1, wherein the phase detector is used to detect the phase difference between the input and the output of a transmitter chain or a power amplifier, a phase detector comprising:
   a coupler that provides attenuated version of a power amplifier or transmitter chain input and output signals;
   an amplitude hard limiter that removes the amplitude of the attenuated input signal to a power amplifier or a transmitter chain and keeps the phase of the signal;
   an amplitude hard limiter that removes the amplitude of the attenuated output signal from a power amplifier or a transmitter chain and keeps the phase of the signal;
   a frequency divider that divides the frequency of input and output of a power amplifier or a transmitter chain after removing the amplitude by a hard limiter to a lower frequency;
   the phase detector that takes the hard limited and frequency divided input and output of a power amplifier or a transmitter chain to produce the phase difference between input and the output of a power amplifier or a transmitter chain;
   an analog to digital converter that digitizes the phase difference between input and output of the power amplifier or transmitter chain.

7. The combined peak reduction equalizer filter and phase/amplitude pre-distortion according to claim 1, wherein the envelop detector is used to detect the envelope of the signal at the output of a transmitter chain or a power amplifier, the envelope detector comprising:
   a coupler that provides attenuated version of a power amplifier or transmitter chain output signal;
   an amplitude hard limiter that removes the amplitude of the attenuated output signal from a power amplifier or a transmitter chain and keeps the phase of the signal;
   a multiplier that multiplies the phase of the output of a power amplifier or a transmitter chain with the attenuated output of a power amplifier or transmitter chain to produce the envelope of a power amplifier or a transmitter chain output signal;
   an analog to digital converter that digitizes the envelope of a power amplifier or a transmitter chain output signal.

8. The combined peak reduction equalizer filter and phase/amplitude pre-distortion according to claim 1, wherein a phase/envelope detector is used to detect the phase difference between the input and the output of the transmitter chain or a power amplifier and the envelope of the output of the power amplifier or the transmitter chain, a phase/envelope detector comprising:
   a coupler that provides attenuated version of a power amplifier or a transmitter chain input and output signals;
   an amplitude hard limiter that removes the amplitude of the attenuated input signal to a power amplifier or a transmitter chain and keeps the phase of the signal;
   an amplitude hard limiter that removes the amplitude of the attenuated output signal from a power amplifier or a transmitter chain and keeps the phase of the signal;
   a multiplier that multiplies the phase of the input and output of a power amplifier or a transmitter chain to produce the phase difference between input and the output of a power amplifier or a transmitter chain;
   a multiplier that multiplies the phase of the output of a power amplifier or a transmitter chain with the attenuated output of a power amplifier or transmitter chain to produce the envelope of output signal of a power amplifier or a transmitter chain;
   a switch that selects between the phase difference between input and output of a power amplifier or a transmitter chain and a power amplifier or a transmitter chain output envelop;
   an analog to digital converter that digitizes the phase difference between input and output of a power amplifier or a transmitter chain and the output envelope of a power amplifier or a transmitter chainl.

9. The combined peak reduction equalizer filter and phase/amplitude pre-distortion according to claim 1, is used in any wireless and wireline communication transmitter, in wireless cellular, wireless PCS, wireless LAN, Wireless WAN, Wireless Broadband, microwave, wireless satellite, WiMax, wireless audio and video broadcasting, any wireline broadband cable and Digital Subscriber Line (DSL) transmitter, optical transmitters, and any wireless communication systems used for military applications.

10. The combined peak reduction equalizer filter and phase/amplitude pre-distortion according to claim 1, wherein the Digital Signal Processing (DSP) circuits can be implemented in programmable logic, Field Programmable Gate Array (FPGA), Gate Array, Application Specific Integrated Circuit (ASIC), and DSP processor.

* * * * *